(12) United States Patent
Seo et al.

(10) Patent No.: US 8,341,161 B2
(45) Date of Patent: Dec. 25, 2012

(54) INDEX DATABASE CREATING APPARATUS AND INDEX DATABASE RETRIEVING APPARATUS

(75) Inventors: Jin Soo Seo, Daejeon (KR); Seungjae Lee, Daejeon (KR); Sang Kwang Lee, Daejeon (KR); Wonyoung Yoo, Daejeon (KR); Yong-Seok Seo, Daejeon (KR); Young-Suk Yoon, Daejeon (KR); Young Ho Suh, Daejeon (KR); Weon Geun Oh, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 310 days.

(21) Appl. No.: 12/744,146

(22) PCT Filed: Dec. 8, 2008

(86) PCT No.: PCT/KR2008/007247

§ 371 (c)(1),
(2), (4) Date: May 21, 2010

(87) PCT Pub. No.: WO2009/078613

PCT Pub. Date: Jun. 25, 2009

(65) Prior Publication Data

US 2010/0268715 A1    Oct. 21, 2010

(30) Foreign Application Priority Data

Dec. 17, 2007    (KR) .......................... 10-2007-0132670

(51) Int. Cl.
G06F 17/30    (2006.01)

(52) U.S. Cl. ..................................................... 707/741

(58) Field of Classification Search ........................ None
See application file for complete search history.

(56) References Cited

U.S. PATENT DOCUMENTS

| 5,485,611 | A  | * | 1/1996  | Astle ................................... 1/1 |
| 6,675,174 | B1 | * | 1/2004  | Bolle et al. .......................... 1/1 |
| 2002/0083060 | A1 | * | 6/2002  | Wang et al. ..................... 707/10 |
| 2004/0218896 | A1 | * | 11/2004 | Abe et al. ....................... 386/46 |
| 2005/0021512 | A1 | * | 1/2005  | Koenig ............................ 707/3 |
| 2005/0289066 | A1 | * | 12/2005 | Weare ............................. 705/51 |

(Continued)

FOREIGN PATENT DOCUMENTS

KR    1019950020255 A    7/1995

(Continued)

OTHER PUBLICATIONS

"Classification of General Audio Data for Content-based Retrieval," by Li et al. IN: Pattern Recognition Letters, vol. 22, Is. 5 pp. 533-544 (2001). Available at: Sciencedirect.*

(Continued)

*Primary Examiner* — Neveen Abel Jalil
*Assistant Examiner* — Daniel Kinsaul

(57) ABSTRACT

An index database creating apparatus includes a feature extracting unit for extracting features from a content; an index creating unit for creating feature indices of the extracted features; an index selector for selecting one or more of the feature indices based on frequency-based importance levels thereof; and a feature index database for storing therein the selected feature indices along with locations thereof in the content. The index selector obtains the frequency-based importance levels based on frequency distributions of the feature indices in the content and in other contents to be stored in the feature index database.

9 Claims, 4 Drawing Sheets

U.S. PATENT DOCUMENTS

| | | | |
|---|---|---|---|
| 2006/0031217 A1* | 2/2006 | Smith et al. | 707/5 |
| 2007/0055500 A1* | 3/2007 | Bilobrov | 704/217 |
| 2007/0067482 A1* | 3/2007 | Johnson et al. | 709/231 |

FOREIGN PATENT DOCUMENTS

| | | | |
|---|---|---|---|
| KR | 1020020049694 A | 6/2002 |
| KR | 1020020067162 A | 8/2002 |
| KR | 1020030059085 A | 7/2003 |
| KR | 1020040086350 A | 10/2004 |
| KR | 1020060111171 A | 10/2006 |

OTHER PUBLICATIONS

International Search Report for PCT/KR2008/007247 filed Dec. 8, 2008.

Written Opinion of the International Searching Authority for PCT/KR2008/007247 filed Dec. 8, 2008.

* cited by examiner

INDEX DATABASE CREATING APPARATUS AND INDEX DATABASE RETRIEVING APPARATUS

CROSS-REFERENCE(S) TO RELATED APPLICATION(S)

The present invention claims priority of Korean Patent Application No. 10-2007-0132670, filed on Dec. 17, 2007, which is incorporated herein by reference.

TECHNICAL FIELD

The present invention relates to an index database; and, more particularly, to an apparatus for creating an index database by creating feature indices of a content, which is an object of content recognition, and by selectively storing the feature indices according to distribution properties of the feature indices in the content and in other contents to be stored in the index database to reduce a size of the index database and increase a content recognition speed, and an apparatus for retrieving the index database.

This work was supported by the IT R&D program of MIC/IITA. [2007-S-017-01, Development of user-centric contents protection and distribution technology]

BACKGROUND ART

With appearance of services associated with various types of digital contents such as broadcastings, movies, music and UCC (User Created Content), demands for content recognition technology for protecting and utilizing the contents are drastically being increased.

A content recognition system receives content signals of an input content and recognizes the input content by searching a previously created feature index database. The content recognition system can be applied to various fields such as monitoring of broadcasting advertisements and music, file filtering in a file sharing service and the like. In order to be used in the above-described fields, the content recognition system needs to efficiently store a large amount of contents in a database, to rapidly retrieve the contents from the database and to accurately recognize various content signals transformed via compression, filtering and the like. In particular, in the monitoring of the broadcasting and the file filtering based on a mass content feature database, not only accurate recognition but also size-reduction of the database and rapid content recognition for real-time processing are very important factors.

There exist many content recognition systems. A first example is a system in which features are extracted from feature points (referred to as landmarks) of an audio content and stored in a database. A second example is a system in which features extracted from image contents, e.g., fingerprints, are sub-sampled and sequentially indexed.

Since an amount of the features to be stored in the database are increased along with an increase of an amount of the contents, there is a serious need for a content recognition system capable of reducing the index database in size.

However, since local features of the audio content, i.e., the "landmarks", are used as they are in the first example and the features are simply sub-sampled and indexed sequentially in the second example, the size of the database becomes too large, which results in a significantly long data retrieval time from the database.

DISCLOSURE OF INVENTION

Technical Problem

In view of the above, the present invention provides an apparatus for creating an index database, in which the number of feature indices to be stored in the database is adaptively restricted by considering distribution properties of the feature indices in contents to be stored in the database to thereby reduce a size of the database and shorten a content retrieval time from the database, and an apparatus for retrieving the database.

Technical Solution

In accordance with one aspect of the present invention, there is provided an index database creating apparatus, including:

a feature extracting unit for extracting features from a content;

an index creating unit for creating feature indices of the extracted features;

an index selector for selecting one or more of the feature indices based on frequency-based importance levels thereof; and a feature index database for storing therein the selected feature indices along with locations thereof in the content.

In accordance with another aspect of the present invention, there is provided an index database retrieving apparatus for a feature index database, wherein the feature index database stores therein information on contents including feature indices extracted from the contents and locations of the feature indices in the contents, the apparatus including:

a feature extracting unit for extracting features from an input content;

an index creating unit for creating feature indices of the extracted features;

an index selector for selecting one or more of the feature indices based on frequency-based importance levels thereof;

a candidate location searching unit for comparing the respective selected feature indices with the feature indices stored in the feature index database to retrieve the locations stored in the feature index database as candidate locations of the respective selected feature indices; and an index matching unit for performing a matching between the input content and the contents stored in the feature index database by using distances between locations of the selected feature indices in the input content and the candidate locations retrieved from the feature index database.

Advantageous Effects

According to the present invention, feature indices extracted from a content are selectively stored in a database by considering distribution properties of the feature indices not only in the content but also in other contents. Hence, the amount of the feature indices to be stored in the database is reduced, which results in reduction of both of a storage space and a search space in the database.

The content recognition system according to the present invention may be applied to various fields, e.g., file filtering to prevent illegal sharing of contents through a file sharing service, broadcasting monitoring for investigating a number of broadcasting times of a specific advertisement or music and the like.

BRIEF DESCRIPTION OF THE DRAWINGS

The above features of the present invention will become apparent from the following description of embodiments given in conjunction with the accompanying drawings, in which.

BEST MODE FOR CARRYING OUT THE INVENTION

Hereinafter, embodiments of the present invention will be described in detail with reference to the accompanying drawings, which form a part hereof.

Figure 1:
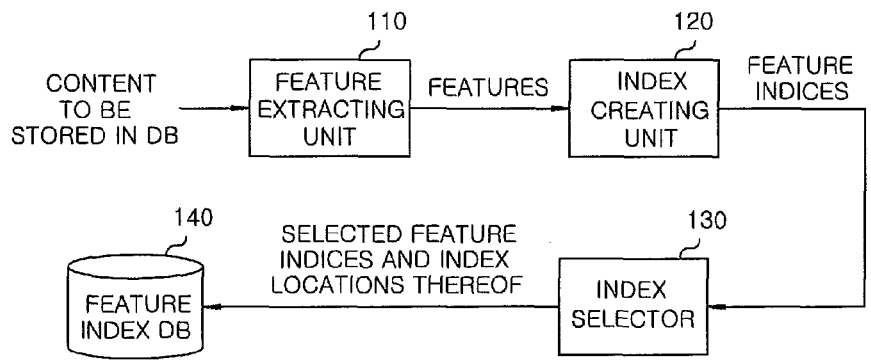
FIG. 1 illustrates a block diagram of an index database creating apparatus in accordance with an embodiment of the present invention.

FIG. 1 illustrates a block diagram of an index database creating apparatus in accordance with an embodiment of the present invention.

Referring to FIG. 1, the index database creating apparatus includes a feature extracting unit 110 for extracting features from a content; an index creating unit 120 for creating feature indices of the extracted features; an index selector 130 for selecting one or more of the feature indices based on frequency-based importance levels thereof; and a feature index database 140 for storing therein the selected feature indices along with locations thereof in the content.

The feature extracting unit 110 extracts the features from the content by considering signal characteristics of the content and human perceptive behaviors.

The index creating unit 120 creates the feature indices by converting the extracted features via quantization by considering properties of the extracted features.

To be specific, the feature extracting unit 110 may extract a feature from a content for every specific time interval, and the index creating unit 120 may convert the extracted feature into one of specific number of feature indices via quantization.

The index selector 130 obtains the frequency-based importance levels of the feature indices based on frequency distributions of the feature indices in the content and in other contents to be stored in the feature index database 140. Based on the frequency-based importance levels, the index selector 130 determines whether or not to store the respective feature indices in the feature index database 140.

In order to obtain the frequency-based importance levels of the respective feature indices via the index selector 130, the index database creating apparatus may, as a preprocess for creating an index database, extract features via the feature extracting unit 110 and create feature indices of the extracted features via the index creating unit 120 for all contents to be stored in the feature index database 140.

The index database creating apparatus according to the prevent invention, having the above-described configuration, can reduce a size of the feature index database 140 by selectively storing the feature indices via the index selector 130 without storing all of the created feature indices.

Figure 2:
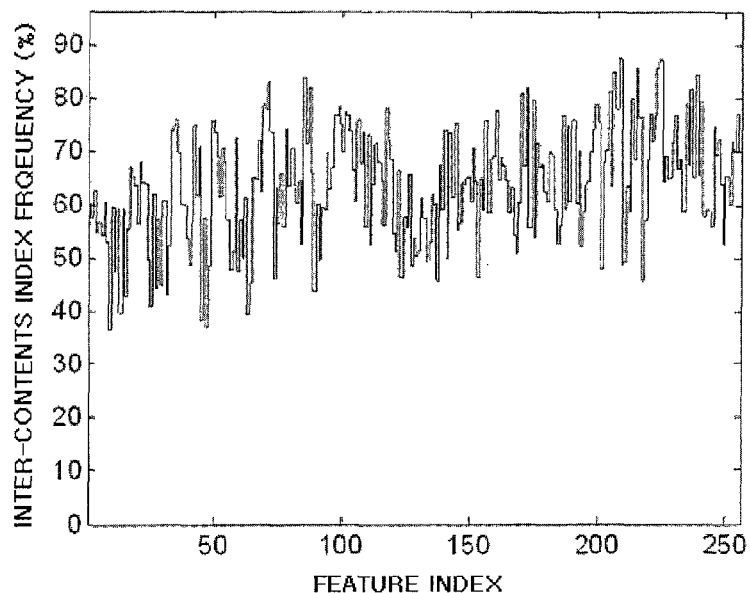
FIGS. 2 and 3 respectively illustrate experimental graphs of an inter-contents index frequency and of an in-content index frequency.
Figure 3:
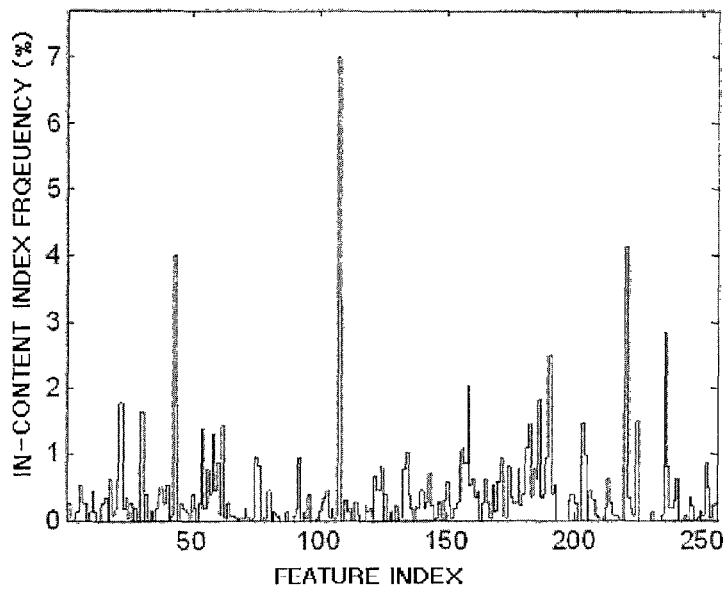

FIGS. 2 and 3 respectively illustrate experimental graphs of an inter-contents index frequency and of an in-content index frequency.

In the experiment of FIGS. 2 and 3, the feature extracting unit 110 extracted a feature of an audio content for every 0.1 second, and the index creating unit 120 converted the extracted feature into an eight-bit binary variable, i.e., into one of 256 feature indices, via quantization.

In this embodiment, two types of index frequency distributions are considered.

A first type of the index frequency distributions is "inter-contents index frequency", which indicates a ratio of a number of contents in which a specific feature index occurs to a total number of contents to be stored in the feature index database 140. For example, the inter-contents index frequency of 0.5 denotes that corresponding feature index is created from half the contents in the feature index database 140. The inter-contents index frequency $$CF_i$$

of an i-th feature index $$f_i$$

is as in Equation 1:

MathFigure 1

$$CF_i = \frac{|\{c_j \mid f_i \in c_j\}|}{|\{c_j\}|} \quad \text{[Math. 1]}$$

wherein, $$|\{c_j\}|$$

denotes the total number of contents to be stored in the feature index database 140 and $$|\{c_j \mid f_i \in c_j\}|$$

denotes the number of contents in which the feature index $$f_i$$

occurs.

A second type of the index frequency distributions is "in-content index frequency", which indicates a ratio of a number of times when a specific feature index occurs in a content to a number of times when any feature index including the specific feature index occurs in the content. The in-content index frequency $$TF_{i,j}$$

of the i-th feature index $$f_i$$

in a j-th content $$c_j$$

is as in Equation 2.

MathFigure 2

$$TF_{i,j} = \frac{\text{occurrence number of feature index } f_i \text{ in content } c_j}{\text{occurrence number of feature indices in content } c_j} \quad \text{[Math. 2]}$$

FIG. 2 illustrates the inter-contents index frequencies of 256 feature indices occurring in 1,000 audio contents, and, FIG. 3 illustrates the in-content index frequencies of 256 feature indices occurring in an audio content having a running time of three minutes and thirty seconds.

Figure 4:
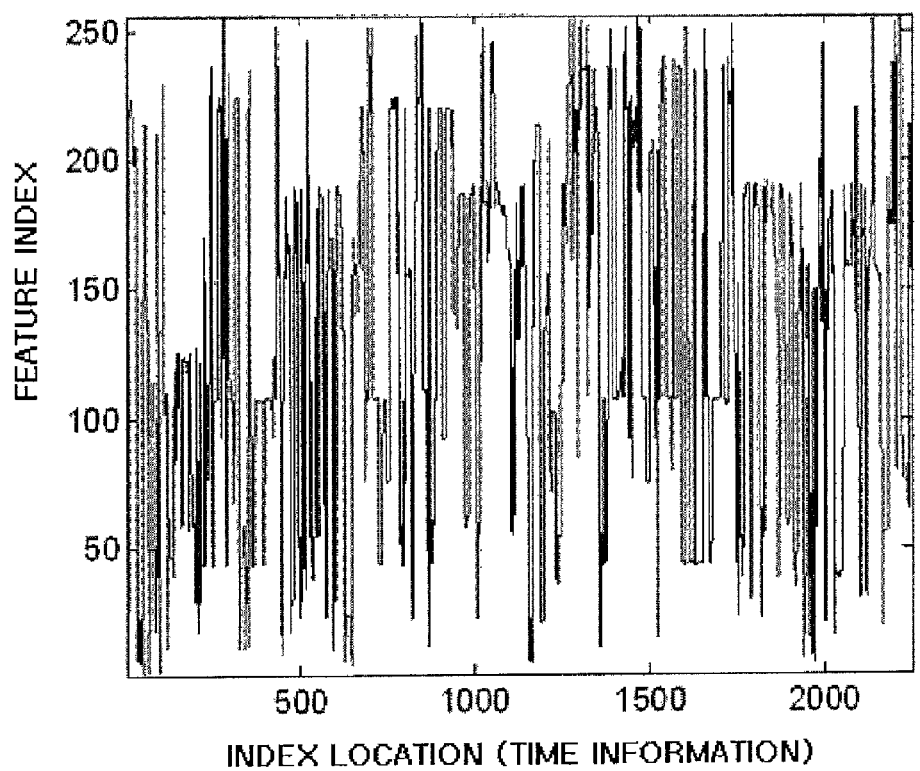
FIGS. 4 and 5 respectively illustrate experimental graphs of feature indices and of frequency-based importance levels of the feature indices.
Figure 5:
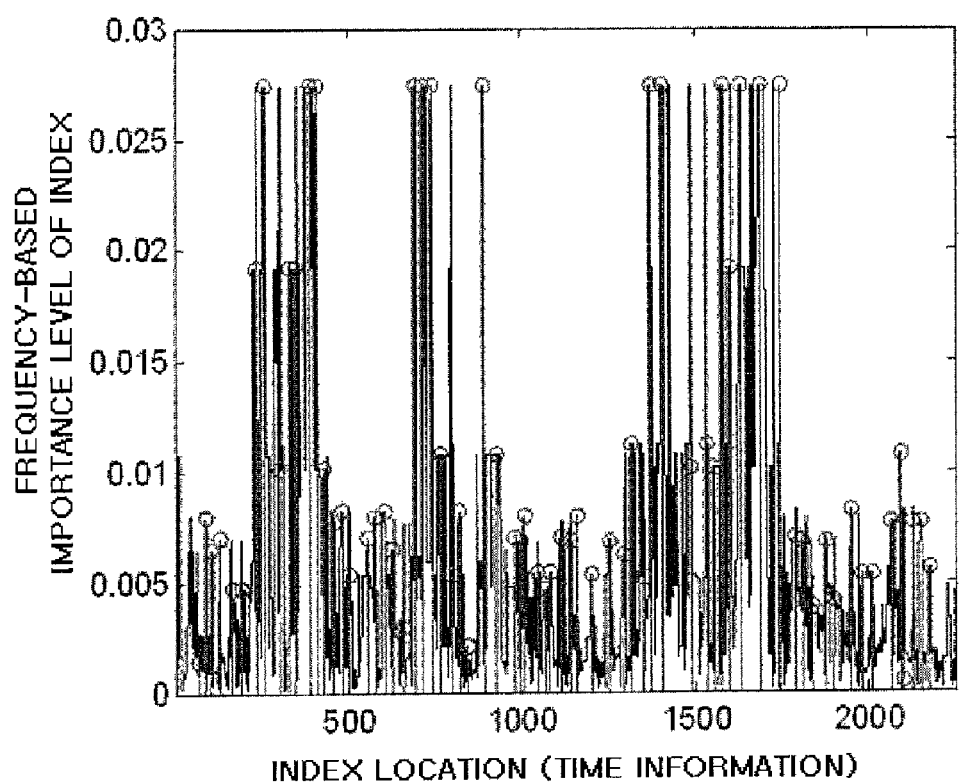

FIGS. 4 and 5 respectively illustrate experimental graphs of feature indices and of frequency-based importance levels of the feature indices.

In this embodiment, the frequency-based importance level $IF_{i,j}$ of the i-th feature indices $f_i$ in the j-th content $c_j$ are obtained using the inter-contents index frequency $CF_i$ and the in-content index frequency $TF_{i,j}$ as in Equation 3.

MathFigure 3

$$IF_{i,j} = \frac{TF_{i,j}}{\log(CF_i)} \quad \text{[Math. 3]}$$

FIG. 4 illustrates the feature indices occurring in an audio content as a function of occurrence time of the respective feature indices (hereinafter, simply referred to as "index location"), and, FIG. 5 illustrates the frequency-based importance levels of the respective feature indices occurring at the respective index locations in the audio contents.

In the experiment of FIGS. 4 and 5, the index selector 130 selected feature indices occurring at index locations having local maximum frequency-based importance levels. However, the index selector 130 may select all feature indices occurring in index locations having frequency-based importance levels equal to or greater than a specific value. In the experiment of FIG. 5, the local maximum was used, and among 2,251 feature indices occurring in an audio content with running time of three minutes and thirty seconds, only sixty-nine feature indices indicated by circles in FIG. 5 are selected.

Figure 6:
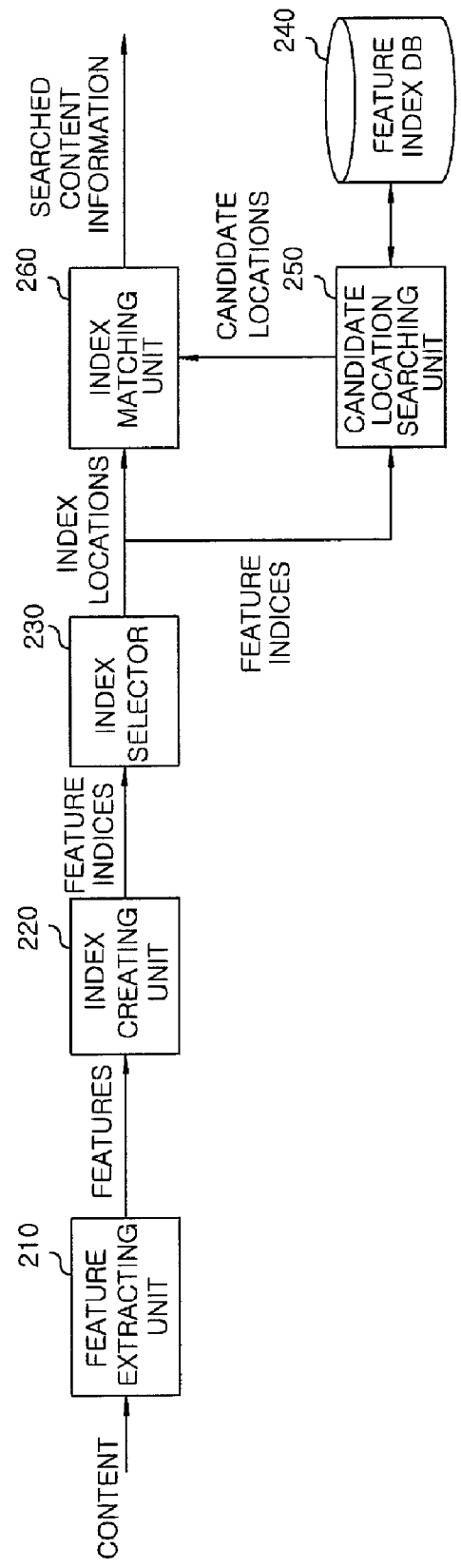
FIG. 6 illustrates a block diagram of an index database retrieving apparatus in accordance with another embodiment of the present invention.

FIG. 6 illustrates a block diagram of an index database retrieving apparatus in accordance with another embodiment of the present invention.

The index database retrieving apparatus is for a feature index database 240 created via the index database creating apparatus according to the present invention. Hence, the feature index database 240 stores therein information on contents including feature indices extracted from the contents and locations of the feature indices in the contents.

Referring to FIG. 6, the index database retrieving apparatus includes a feature extracting unit 210 for extracting features from an input content; an index creating unit 220 for creating feature indices of the extracted features; an index selector 230 for selecting one or more of the feature indices based on frequency-based importance levels thereof; a candidate location searching unit 250 for comparing the respective selected feature indices with the feature indices stored in a feature index database 240 to retrieve the locations stored in the feature index database 240 as candidate locations of the respective selected feature indices; and an index matching unit 260 for performing a matching between the input content and the contents stored in the feature index database 240 by using location differences, i.e., distances, between locations of the selected feature indices in the input content and the candidate locations retrieved from the feature index database 240.

The feature extracting unit 210 extracts the features from the input content by considering signal characteristics of the input content and human perceptive behaviors.

The index creating unit 220 creates the feature indices by converting the extracted features via quantization by considering properties of the extracted features.

The index selector 230 obtains the frequency-based importance levels based on frequency distributions of the feature indices in the input content and in the contents stored in the feature index database 240, and based on the frequency-based importance levels, determines whether or not to search for the respective feature indices in the feature index database 240.

The candidate location searching unit 250 may search for the feature index database 240 to find feature indices having the same values as those of the respective selected feature indices and retrieve the locations of the feature indices found in the feature index database 240 as the candidate locations.

The index matching unit 260 may output information on a specific content stored in the feature index database 240 as a recognition result of a content recognition system, if the matching succeeds on the specific content. Meanwhile, if the matching fails on all the contents stored in the feature index database 240, a message indicating that the input content is not stored in the feature index database 240.

Figure 7:
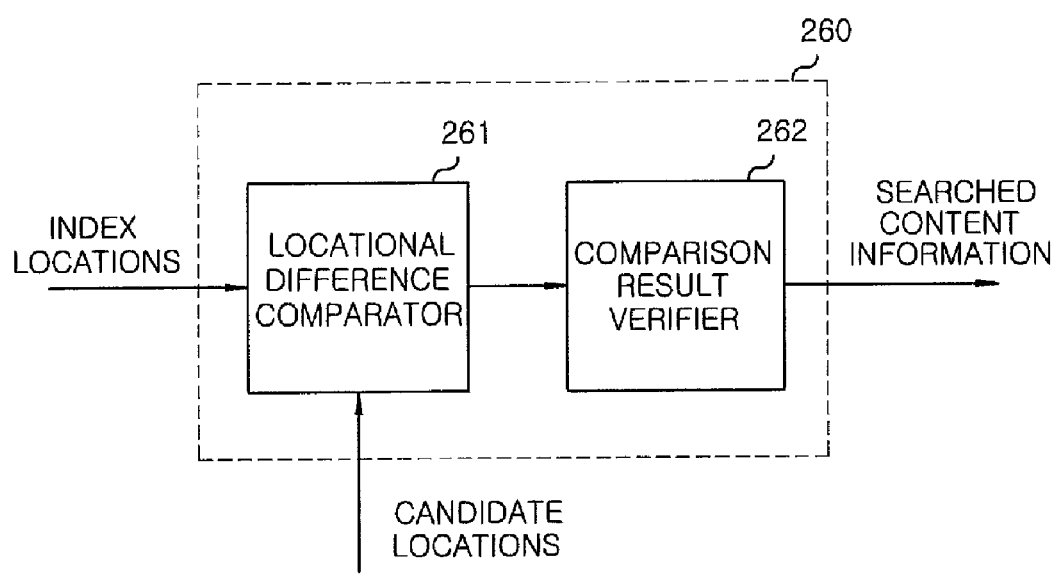
FIG. 7 illustrates a detailed block diagram of the index matching unit of FIG. 6.

FIG. 7 illustrates a detailed block diagram of the index matching unit 260 of FIG. 6.

As shown in FIG. 7, the index matching unit 260 includes a location difference comparator 261 for comparing the locations of the selected feature indices in the input content with the candidate locations retrieved by the candidate location searching unit 250; and a comparison result verifier 262 for verifying location difference comparison result of the location difference comparator 261. The comparison result verifier 262 outputs information on a specific content stored in the feature index database 240 as a recognition result, if the number of matched locations between the locations of the selected feature indices in the input content and the candidate locations retrieved from the specific content by the candidate location searching unit 250 is equal to or greater than a preset threshold value.

For performance evaluation of the index database creating apparatus and the index database retrieving apparatus according to the present invention, subband centroid features were extracted from 1,000 audio contents and quantized to construct a feature index database. Further, after one hundred audio contents were selected from the audio contents stored in the feature index database to be subjected to 3 dB audio equalization and 32 kbps MP3 compression, database retrieval was carried out. The result is as in Table 1.

TABLE 1

| Item | Sequential indexing | Frequency-based indexing (present invention) |
| --- | --- | --- |
| Total number of feature indices stored in database | 2,410,051 | 72,646 |
| Recognition rate (%) | 100 | 93 |

As shown in Table 1, the number of indices to be stored in the database is significantly reduced while relatively slight change occurs in the recognition rate.

While the invention has been shown and described with respect to the embodiments, it will be understood by those skilled in the art that various changes and modification may be made without departing from the scope of the invention as defined in the following claims.

The invention claimed is:

1. An index database creating apparatus comprising a non-transitory computer readable medium, the apparatus comprising:
   a feature extracting unit for extracting features from a content;
   an index creating unit for creating feature indices of the extracted features;
   an index selector for selecting one or more of the feature indices based on frequency-based importance levels thereof; and
   a feature index database for storing therein the selected feature indices along with locations thereof in the content;
   wherein the index selector obtains the frequency-based importance levels based on an inter-contents index frequency and an in-content index frequency and, based on the frequency-based importance levels, determines whether or not to store the respective feature indices in the feature index database, and
   when the determination is to store the respective feature indices, storing the respective feature indices in the feature index database.

2. The apparatus of claim 1, wherein the feature extracting unit extracts the features from the content by considering signal characteristics of the content and human perceptive behaviors.

3. The apparatus of claim 1, wherein the index creating unit creates the feature indices by converting the extracted features via quantization by considering properties of the extracted features.

4. An index database retrieving apparatus for a feature index database comprising a non-transitory computer-readable media, wherein the feature index database stores therein information on contents including feature indices extracted from the contents and locations of the feature indices in the contents, the apparatus comprising:
   a feature extracting unit for extracting features from an input content;
   an index creating unit for creating feature indices of the extracted features;
   an index selector for selecting one or more of the feature indices based on frequency-based importance levels thereof;
   a candidate location searching unit for comparing the respective selected feature indices with the feature indices stored in the feature index database to retrieve the locations stored in the feature index database as candidate locations of the respective selected feature indices; and
   an index matching unit for performing a matching between the input content and the contents stored in the feature index database by using distances between locations of the selected feature indices in the input content and the candidate locations retrieved from the feature index database,
   wherein the index selector obtains the frequency-based importance levels based on an inter-contents index frequency and an in-content index frequency and, based on the frequency-based importance levels, determines whether or not to store the respective feature indices in the feature index database.

5. The index retrieving apparatus of claim 4, wherein the feature extracting unit extracts the features from the input content by considering signal characteristics of the input content and human perceptive behaviors.

6. The index retrieving apparatus of claim 4, wherein the index creating unit creates the feature indices by converting the extracted features via quantization by considering properties of the extracted features.

7. The index retrieving apparatus of claim 4, wherein the index matching unit includes: a location difference comparator for comparing the locations of the selected feature indices in the input content with the candidate locations retrieved by the candidate location searching unit; and a comparison result verifier for verifying location difference comparison result of the location difference comparator.

8. The apparatus of claim 1, wherein the inter-contents index frequency is determined according to the following equation:

$$CF_i = \frac{|\{c_j | f_i \in c_j\}|}{|\{c_j\}|}$$

where $CF_i$ is the inter-contents index frequency, $|\{c_j | f_i \in c_j\}|$ is a number of contents in which feature index $f_i$ occurs, and $|\{c_j\}|$ is a total number of contents to be stored in the feature index database, wherein the in-content index frequency is determined according to the following equation:

$$TF_{i,j} = \frac{\text{number of feature index } f_i \text{ in content } c_j}{\text{number of feature indices in content } c_j}$$

where $TF_{i,j}$ is the in-content index frequency, and wherein the frequency-based importance levels are determined according to the following equation:

$$IF_{i,j} = \frac{TF_{i,j}}{\log(CF_i)}$$

where $IF_{i,j}$ is the frequency-based importance level.

9. The index retrieving apparatus of claim 4, wherein the inter-contents index frequency is determined according to the following equation:

$$CF_i = \frac{|\{c_j | f_i \in c_j\}|}{|\{c_j\}|}$$

where $CF_i$ is the inter-contents index frequency, $|\{c_j | f_i \in c_j\}|$ is a number of contents in which feature index $f_i$ occurs, and $|\{c_j\}|$ is a total number of contents to be stored in the feature index database, wherein the in-content index frequency is determined according to the following equation:

$$TF_{i,j} = \frac{\text{number of feature index } f_i \text{ in content } c_j}{\text{number of feature indices in content } c_j}$$

where $TF_{i,j}$ is the in-content index frequency, and wherein the frequency-based importance levels are determined according to the following equation:

$$IF_{i,j} = \frac{TF_{i,j}}{\log(CF_i)}$$

where $IF_{i,j}$ is the frequency-based importance level.

\* \* \* \* \*